United States Patent
Izumi et al.

(10) Patent No.: US 7,874,218 B2
(45) Date of Patent: Jan. 25, 2011

(54) CAPACITIVE ELECTROMAGNETIC FLOWMETER

(75) Inventors: Kouji Izumi, Tokyo (JP); Toshimitsu Takahashi, Tokyo (JP)

(73) Assignee: Yamatake Corporation, Tokyo (JP)

( * ) Notice: Subject to any disclaimer, the term of this patent is extended or adjusted under 35 U.S.C. 154(b) by 144 days.

(21) Appl. No.: 12/373,768

(22) PCT Filed: Jun. 29, 2007

(86) PCT No.: PCT/JP2007/063105

§ 371 (c)(1),
(2), (4) Date: Jan. 14, 2009

(87) PCT Pub. No.: WO2008/010399

PCT Pub. Date: Jan. 24, 2008

(65) Prior Publication Data

US 2010/0011877 A1    Jan. 21, 2010

(30) Foreign Application Priority Data

Jul. 18, 2006    (JP)    ............................ 2006-195333

(51) Int. Cl.
*G01F 1/60* (2006.01)

(52) U.S. Cl. .................................................. 73/861.12

(58) Field of Classification Search ........ 73/861.11–13, 73/861.16, 861.17
See application file for complete search history.

(56) References Cited

U.S. PATENT DOCUMENTS

| | | | | |
|---|---|---|---|---|
| 5,618,992 A * | 4/1997 | Bond et al. | ..................... | 73/86 |
| 5,773,723 A * | 6/1998 | Lewis et al. | .............. | 73/861.12 |
| 5,866,823 A * | 2/1999 | Scarpa | ..................... | 73/861.16 |
| 6,973,840 B2 * | 12/2005 | Cushing | .................. | 73/861.17 |

FOREIGN PATENT DOCUMENTS

| | | |
|---|---|---|
| JP | 07-110249 A | 4/1995 |
| JP | 08-166266 A | 6/1996 |
| JP | 08-219834 A | 8/1996 |
| JP | 08-271304 A | 10/1996 |
| JP | 2002-071408 A | 3/2002 |
| JP | 2003-065815 A | 3/2003 |
| JP | 2004-138457 A | 5/2004 |

* cited by examiner

*Primary Examiner*—Jewel Thompson

(57) ABSTRACT

A measuring pipe obtained by applying an insulating resin lining to the inside of a nonmagnetic pipe is employed. A through hole reaching the resin lining is made in the sidewall of the nonmagnetic pipe, and a signal electrode and a guard electrode are arranged in the through hole. The through hole is filled with an insulating vibration absorbing member so as to cover the periphery of the signal electrode and the guard electrode. A gelatinous substance of silicon resin, or the like, is employed as the vibration absorbing member, but liquid such as oil may be employed to liquid seal the signal electrode and the guard electrode in the through hole. Consequently, the electromagnetic flowmeter can be formed compact and its production is facilitated.

5 Claims, 8 Drawing Sheets

CAPACITIVE ELECTROMAGNETIC FLOWMETER

CROSS REFERENCE TO RELATED APPLICATIONS

This is a U.S. national phase application under 35 U.S.C. §371 of International Patent Application No. PCT/JP2007/063105, filed Jun. 29, 2007 and claims the benefit of Japanese Application 2006-195333, filed Jul. 18, 2006. The International Application was published in Japanese on Jan. 24, 2008 as International Publication No. WO 2008/010399 under PCT Article 21(2) the contents of which are incorporated herein in their entirety.

FIELD OF THE INVENTION

The present invention relates to a capacitive electromagnetic flowmeter provided with a signal electrode that is coupled through electrostatic capacitance with a fluid that flows within a measuring pipe.

BACKGROUND

Conventionally, this type of capacitive electromagnetic flowmeter has an excitation coil that produces a magnetic field in a direction that is perpendicular relative to the direction of flow of a fluid that flows within a measuring pipe, a signal electrode that is coupled through electrostatic capacitance with the fluid that flows within the measuring pipe, provided in the measuring pipe, and a guard electrode for shielding the signal electrode, where the electromotive force that is generated in the fluid that is flowing within the measurement pipe due to the magnetic field that is produced by the excitation coil is extracted by the signal electrode. Note that the signal electrode and the guard electrode are provided in a direction that is perpendicular to the magnetic field that is produced by the excitation coil.

CONVENTIONAL EXAMPLE 1

FIGS. 5A and 5B illustrate critical components in a first conventional example of a capacitive electromagnetic flowmeter, proposed in Japanese Unexamined Patent Application Publication H7-110249. In FIGS. 5A and 5B, 1 is a measuring pipe made out of ceramic, 2 is a signal electrode, and 3 is a guard electrode that shields the signal electrode 2. A buffer ceramic portion 4 is provided on the outside of the measuring pipe 1, and the signal electrode 2 and the guard electrode 3 are embedded within the buffer ceramic portion 4.

Note that, although not shown in FIGS. 5A and 5B, an excitation coil is provided for producing a magnetic field in a direction that is perpendicular to the direction of flow of the fluid that flows within the measurement pipe 1, and two sets of signal electrodes 2 and guard electrodes 3 are provided facing each other. Furthermore, the buffer ceramic portion 4 has a coefficient of thermal expansion that is between the coefficient of thermal expansion of the signal electrode 2 and the guard electrode 3 and the coefficient of thermal expansion of the measurement pipe (the ceramic) 1.

CONVENTIONAL EXAMPLE 2

FIGS. 6A and 6B illustrate critical components in a second conventional example of a capacitive electromagnetic flowmeter proposed in U.S. Pat. No. 4,631,969. In FIGS. 6A and 6B, 5 is a measuring pipe wherein an insulating resin lining 7 made from PFA (fluorine resin), or the like, is provided on the inside of a nonmagnetic pipe (for example, a stainless steel pipe) 6, 8 is a signal electrode, and 9 is a guard electrode that shields the signal electrode 8. The signal electrode 8 and the guard electrode 9 are embedded in the resin lining 7.

Note that, although not shown in FIGS. 5A and 5B, an excitation coil is provided for producing a magnetic field in a direction that is perpendicular to the direction of flow of the fluid that flows within the measurement pipe 5, and two sets of signal electrodes 8 and guard electrodes 9 are provided facing each other. As with the capacitive electromagnetic flowmeter illustrated in FIGS. 5A and 5B, in the capacitive electromagnetic flowmeter set forth above, an excitation coil for producing a magnetic field that is in a direction that is perpendicular to the direction of flow of a fluid that flows within the measuring pipe 5 is provided, and two sets of signal electrodes 8 and guard electrodes 9 are provided facing each other in a direction that is perpendicular to the magnetic field that is produced by the excitation coil.

CONVENTIONAL EXAMPLE 3

FIGS. 7A and 7B illustrate critical components in a third conventional example of a capacitive electromagnetic flowmeter proposed in Japanese Unexamined Patent Application Publication 2002-71408. In FIGS. 7A and 7B, 10 is a measuring pipe made out of ceramic; 11 is a signal electrode that is provided on the inner peripheral surface of the measuring pipe 10; and 12 is a guard case (guard electrode) that is provided so as to cover the signal electrode 11. A gelatinous resin (for example, a silicon resin) 13 is filled into the guard case 12.

As with the capacitive magnetic flowmeter illustrated in FIGS. 5A and 5B, in the capacitive electromagnetic flowmeter set forth above, an excitation coil is provided for producing a magnetic field in a direction that is perpendicular to the direction of flow of the fluid that flows within the measurement pipe 10, and two sets of signal electrodes 11 and guard electrodes 12 are provided facing each other.

However, in the capacitive electromagnetic flowmeters set forth above, in Conventional Example 1 (FIGS. 5A and 5B) the flow of the fluid is within the measuring pipe 1 that is made out of ceramic, so, because the surface of the ceramic is rough compared to the surface of a resin molding from, for example, PFA, there is the problem that, if the fluid that makes contact is adhesive, the fluid from the surface of the ceramic tends to adhere. When the fluid adheres, the output from the flowmeter is decreased and, over an extended period of time, it becomes impossible to detect the electromotive force, and thus there has been a problem in that the output ceases to be produced.

In contrast, in Conventional Example 2 (FIGS. 6A and 6B) a resin lining 7 provided with in the nonmagnetic pipe 6, and the signal electrode 8 and the guard electrode 9 are provided in the resin lining 7. In this case, the surface of the resin lining is smooth, so the problems with the fluid adhesion, such as found in the case of the ceramic, are unlikely. However, sometimes there is inadequate contact between the resin lining and the electrodes, so the friction between the resin lining and the electrodes due to vibrations gives rise to static electricity, resulting in problems such as causing variability in the output of the flowmeter.

In Conventional Example 3 (FIGS. 7A and 7B), the signal electrode 11 is covered by a gelatinous resin 13, so that even if the guard case 12 is vibrated by the fluid that flows in the measuring pipe 10, it is difficult for these vibrations to propagate to the surface of the signal electrode 11, thus achieving stability in the output of the flowmeter. However, there is a problem in that the signal electrode 11, gelatinous resin 13, and the guard case 12 covering them protrude greatly out in the outer peripheral portion of the measuring pipe 10, tending to cause the electromagnetic flowmeter to be larger, and making manufacturing difficult.

SUMMARY OF THE INVENTION

The object of the present invention is to provide a capacitive electromagnetic flowmeter that prevents the adhesion of the fluid, that is unaffected by vibrations due to the flow of the fluid, that is compact, and that can be manufactured easily.

The capacitive electromagnetic flowmeter according to the present invention, in order to achieve the object set forth above, includes: a measuring tube wherein an insulating resin lining has been performed on the inner peripheral surface of a nonmagnetic pipe; an excitation coil for producing an electromagnetic field in a direction that is perpendicular to the direction of the fluid that is flowing within the measuring pipe; a through hole, penetrating the nonmagnetic pipe side wall in a direction that is perpendicular to the magnetic field that is produced by the excitation coil; a signal electrode, disposed in the through hole, for electrostatic capacitive linking with the fluid that is flowing within the measuring pipe; a guard electrode, disposed within the through hole, for shielding the signal electrode; and insulating vibration absorbing material that fills the through hole so as to cover the periphery of the signal electrode and the guard electrode.

In the present invention, the fluid that flows in the measuring pipe contacts the resin lining on the inner peripheral surface of a nonmagnetic pipe. Additionally, the signal electrode and the guard electrode are provided in a state wherein the through hole that is formed in the side wall of the nonmagnetic pipe, that is, the space in the direction of thickness of the nonmagnetic pipe with the bottom thereof being the resin lining, is filled with an insulating vibration absorbing material.

In the present invention, a measuring pipe is used wherein a resin lining is performed on the inside of the nonmagnetic pipe, where the fluid that flows within the measuring pipe contacts the resin lining, making adhesion of the fluid difficult. Furthermore, in the present invention, a through hole is provided in the peripheral surface of the nonmagnetic pipe, reaching the resin lining, the signal electrode and the guard electrode are provided within the through hole of the nonmagnetic pipe, and an insulating vibration absorbing material is provided so as to cover around the signal electrode and the guard electrode, enabling miniaturization and easier manufacturing, without the structure for absorbing the vibrations that are produced by the flow of the fluid from protruding too far to the outside of the measuring pipe.

BRIEF DESCRIPTION OF THE DRAWINGS

FIG. 1B is a sectional diagram along the section IV-IV in FIG. 1.

FIG. 2B is a sectional diagram along the section V-V in FIG. 2A.

FIG. 5B is a sectional diagram along the section I-I in FIG. 5A.

FIG. 6B is a sectional diagram along the section II-II in FIG. 6A.

FIG. 7B is a sectional diagram along the section III-III in FIG. 7A.

DETAILED DESCRIPTION OF THE INVENTION

Figure 1A:
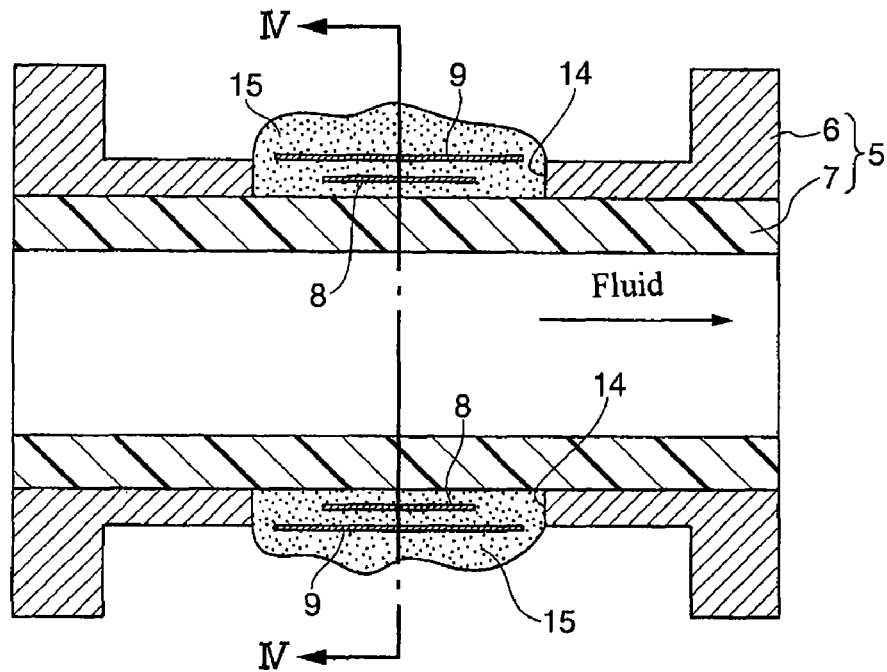
FIGS. 1A-1B FIG. 1A is a lateral sectional diagram of a capacitive electromagnetic flowmeter according to an of embodiment according to the present invention.
Figure 1B:
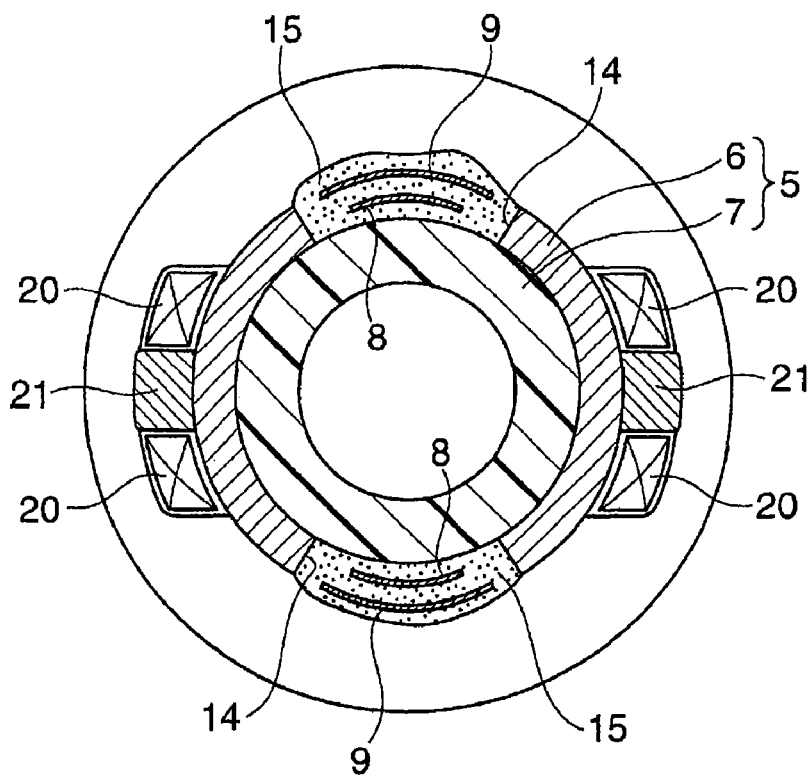
Figure 5A:
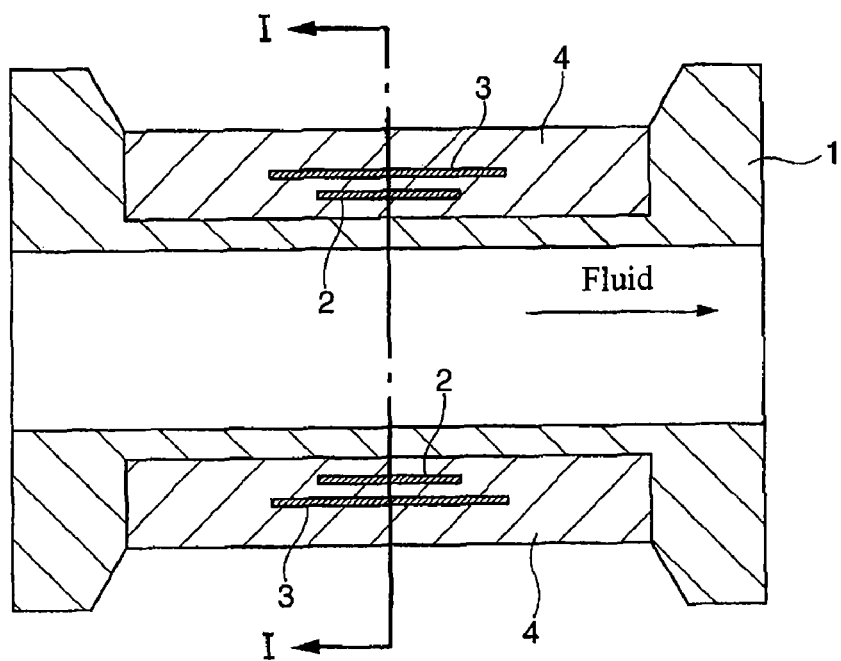
FIGS. 5A-5B FIG. 5A is a lateral sectional diagram of a first conventional example of a capacitive electromagnetic flowmeter.
Figure 5B:
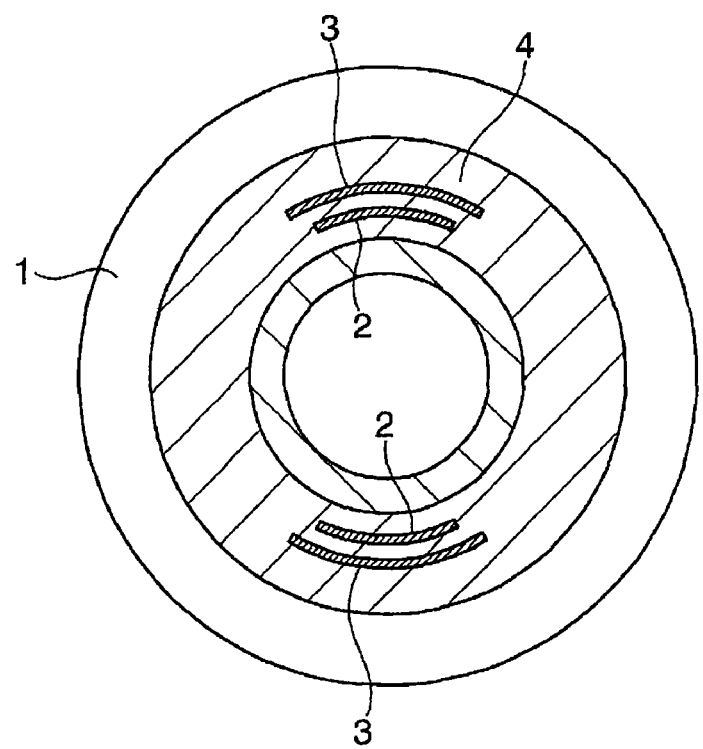

The present invention will be described in detail based on the drawings below. A capacitive electromagnetic flowmeter according to an embodiment according to the present invention will be explained using FIGS. 1A and 1B. In FIGS. 1A and 1B, 5 is a measuring pipe structured from a nonmagnetic pipe (for example, a stainless steel pipe) 6 and an insulating resin lining 7 of, for example, PFA (a fluorine resin) provided on the inner peripheral surface of the non-magnetic pipe 6; 8 is a signal electrode; and 9 is a guard electrode for shielding the signal electrode 8.

Figure 6A:
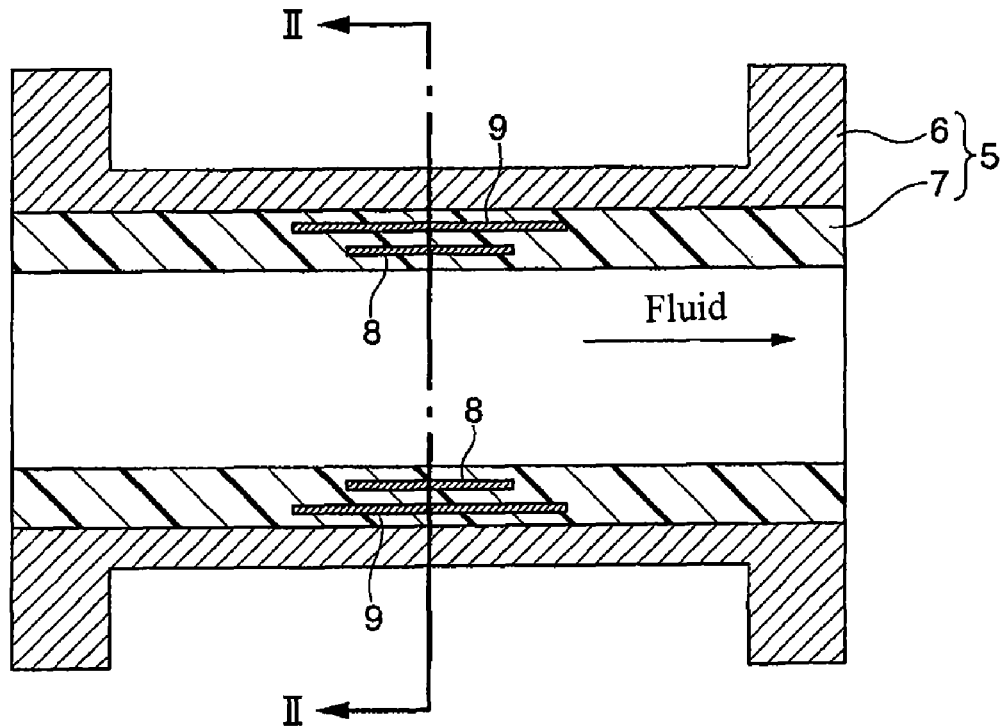
FIGS. 6A-6B FIG. 6A is a lateral sectional diagram of a first conventional example of a capacitive electromagnetic flowmeter.
Figure 6B:
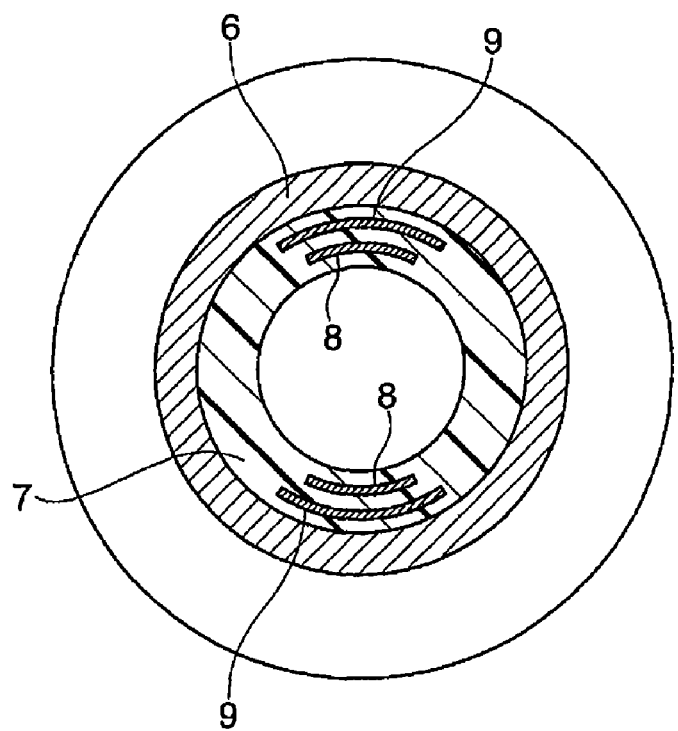
Figure 7A:
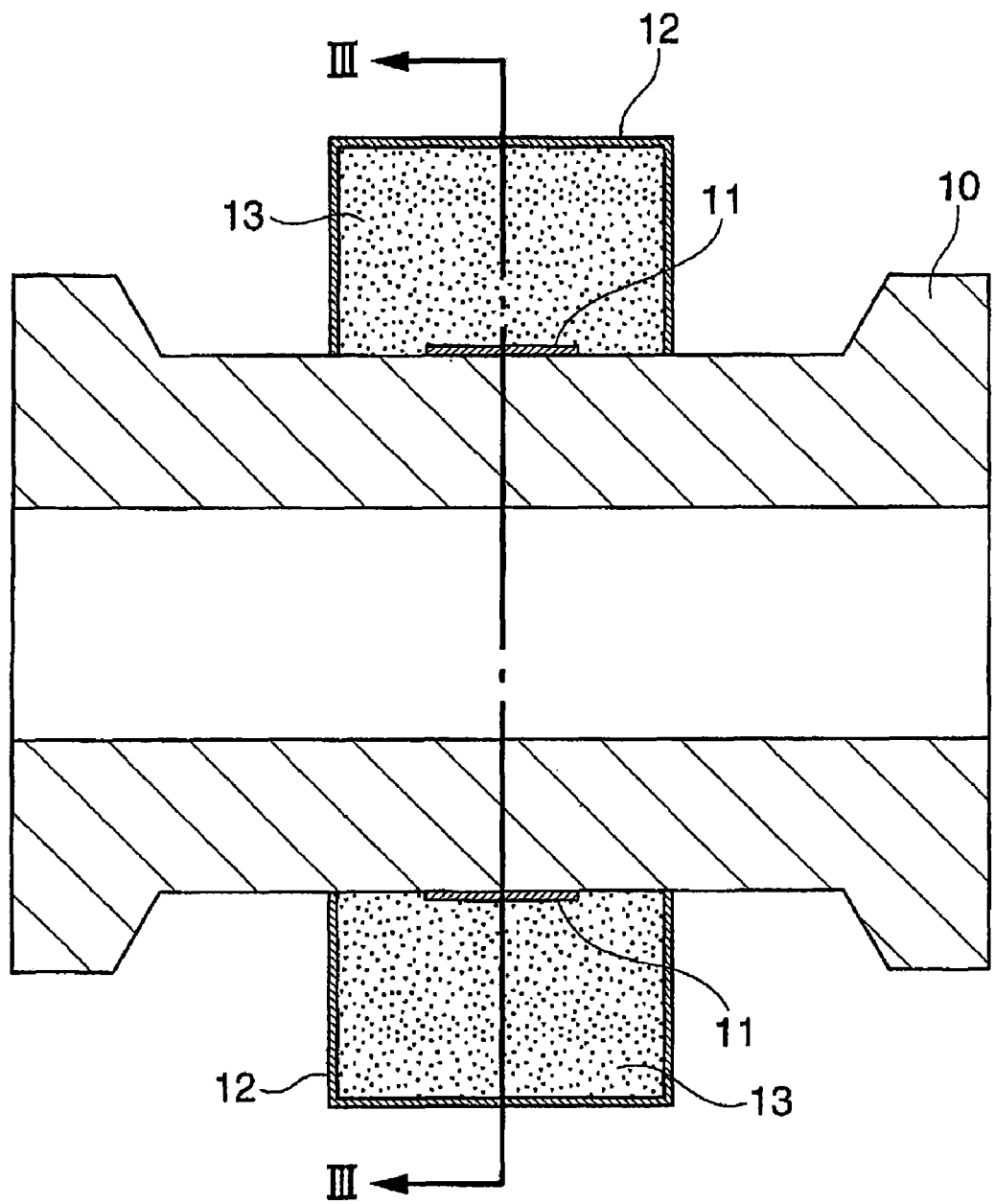
FIGS. 7A-7B FIG. 7A is a lateral sectional diagram of a first conventional example of a capacitive electromagnetic flowmeter.
Figure 7B:
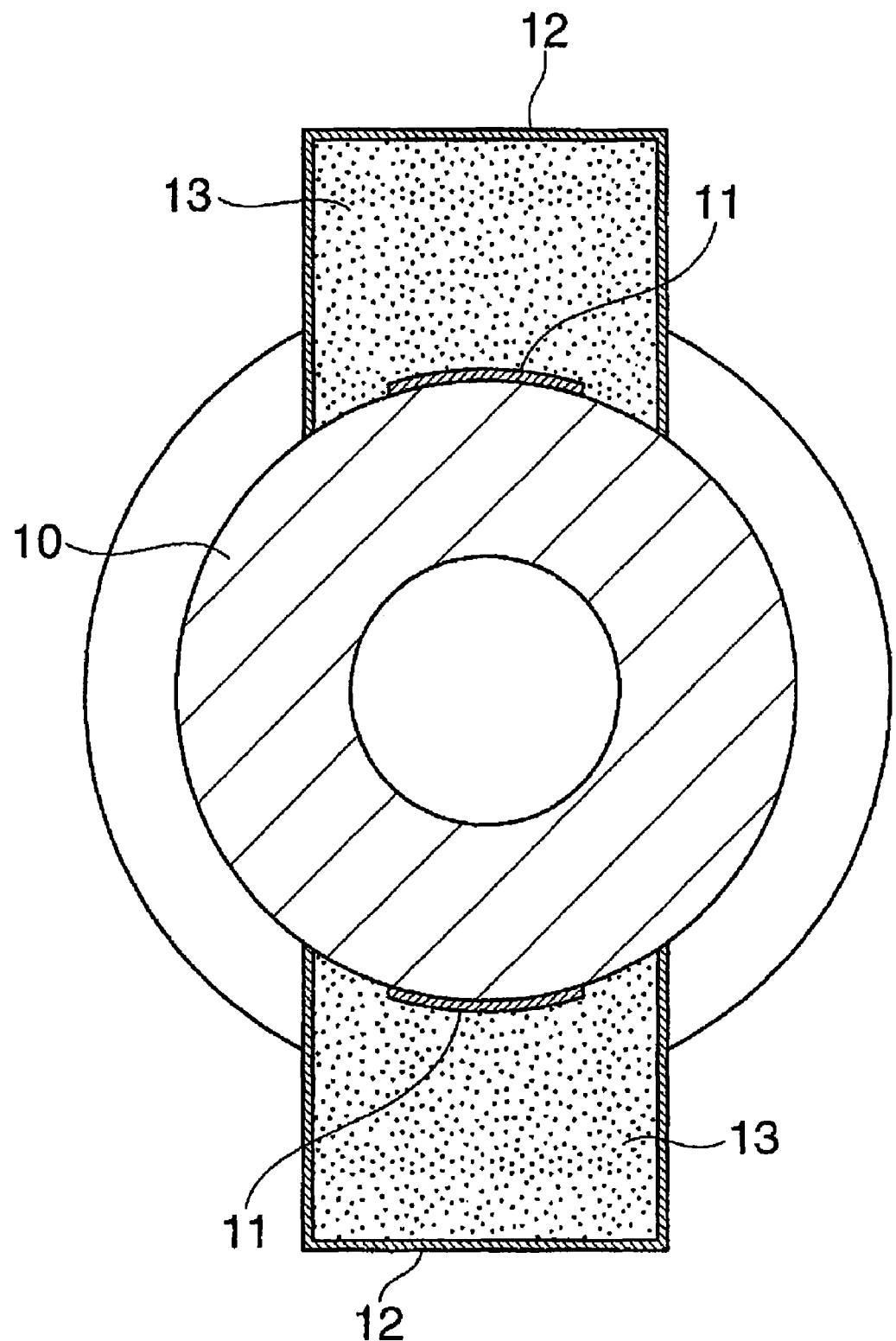

In this embodiment, as with the second conventional example illustrated in FIGS. 6A and 6B, the measuring pipe 5 wherein a resin lining 7 of PFA, or the like, has been provided on the inside of a nonmagnetic pipe 6 is used. However, the position of the signal electrode 8 and the guard electrode 9, and the structure for their attachment, are different from those in the second conventional example.

In the second conventional example, the signal electrode 8 and the guard electrode 9 were embedded in the resin lining 7. However, in this embodiment, a through hole 14 that reaches the resin lining 7 is formed in the side wall of the nonmagnetic pipe 6, and the signal electrode 8 and the guard electrode 9 are positioned within the through hole 14. Moreover, the inside of the through hole 14 is filled with an insulating vibration absorbing material 15 so as to cover the periphery of the signal electrode 8 and the guard electrode 9. That is, the signal electrode 8 and the guard electrode 9 are embedded in the vibration absorbing material 15 that fills the through hole 14.

In this embodiment, the vibration absorbing material 15 is of a gelatinous nature that makes excellent contact with the electrode material (such as stainless steel). For example, silicon resin is used as the gelatinous substance. Silicon resin is a resin that is fluid, with low cross-linking density, and has the effect of absorbing vibrations.

Note that an excitation coil 20 for producing a magnetic field in a direction that is perpendicular to the direction of flow of the fluid that flows within the measuring pipe 5 is provided with coils around a core 21. Additionally, the signal electrode 8 and the guard electrode 9 are provided in a direction that is perpendicular to the magnetic field that is produced by the excitation coil 20.

In the capacitive electromagnetic flowmeter as set forth above, the fluid that flows within the measuring pipe 5 makes contact with the resin lining 7 that is provided on the inside of the nonmagnetic pipe 6. Because the surface of the resin lining 7 is smooth, there is little likelihood of a problem with fluid adhesion, such as the case for the ceramic that was described in Conventional Example 2.

Furthermore, in the capacitive electromagnetic flowmeter set forth above, the periphery of the signal electrode 8 and the guard electrode 9 are covered by a vibration absorbing material 15. As a result, even if vibrations were to occur in the measuring pipe 5 due to the fluid that is flowing within the measuring pipe 5, the vibrations would be absorbed by the vibration absorbing material 15, thus suppressing the production of a static electricity due to friction on the electrode surfaces of the signal electrode 8 and the guard electrode 9, enabling a stabilization of the output of the flowmeter.

Additionally, in the capacitive electromagnetic flowmeter set forth above, the signal electrode 8 and the guard electrode 9 are disposed in the through hole 14 that is formed in the side wall of the nonmagnetic pipe 5, or in other words, are disposed in a state wherein the space in the direction of thickness of the nonmagnetic pipe 5, which has the resin lining 7 as the bottom thereof, is filled with the vibration absorbing material 15 and, as a result, the structure for absorbing the vibrations that are produced by the flow of the fluid does not, for example, protrude greatly to the outside of the measuring pipe 5, enabling miniaturization and easy manufacturing.

Figure 2A:
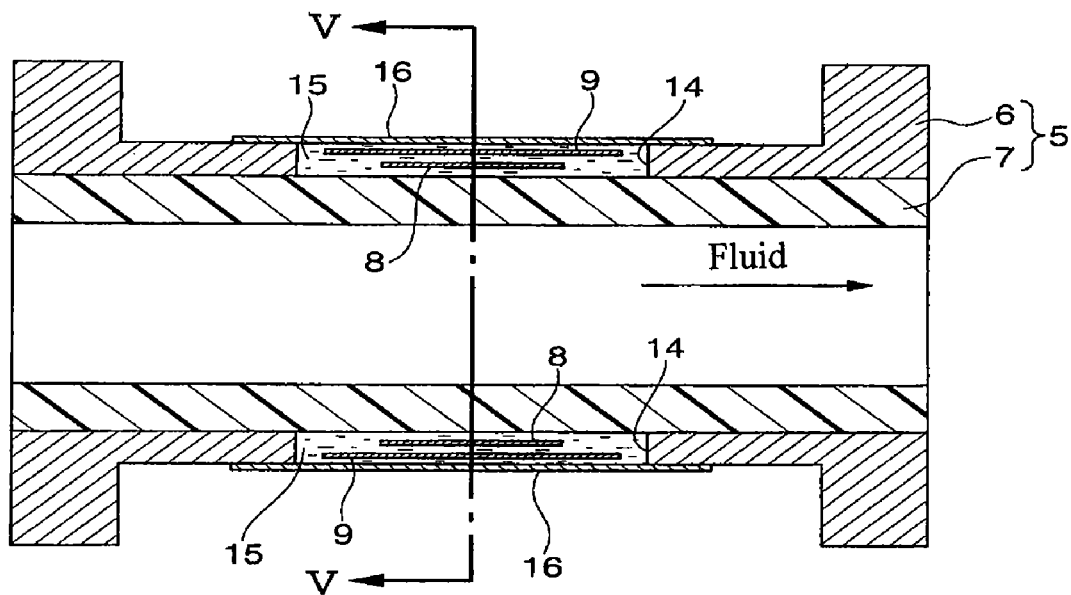
FIGS. 2A-2B FIG. 2A is a lateral sectional diagram of a capacitive electromagnetic flowmeter according to another embodiment according to the present invention.
Figure 2B:
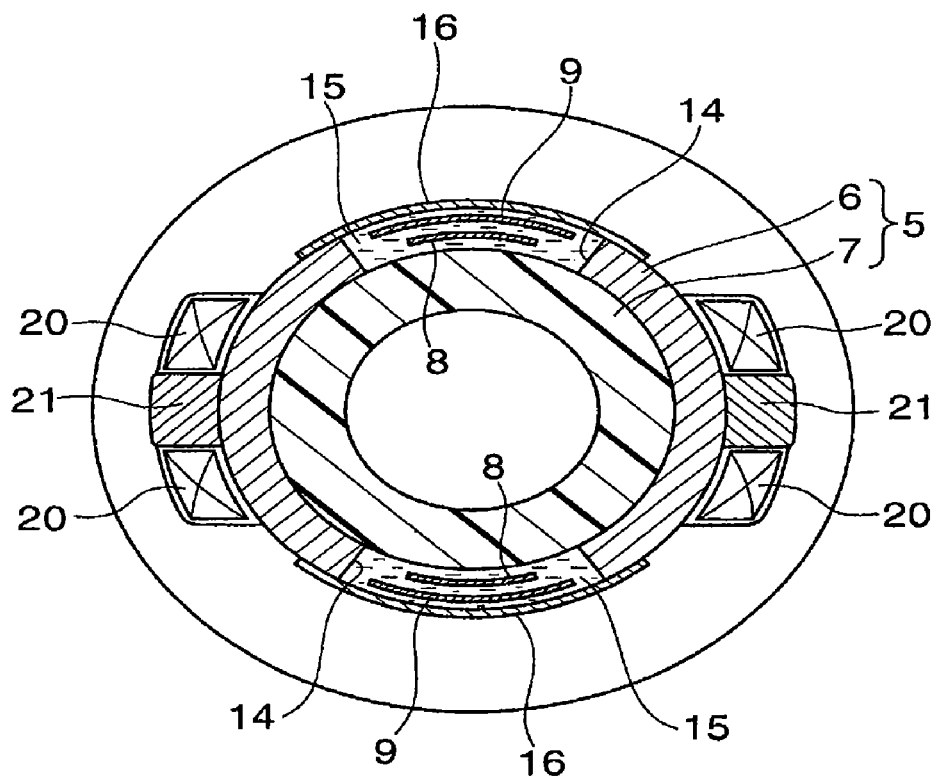

Although in the embodiment set forth above a case was described wherein the vibration absorbing material 15 was a gelatinous substance, the vibration absorbing material 15 is not limited to being a gelatinous substance. In this embodiment, the vibration absorbing material 15 is a liquid, such as oil. An example illustrated in FIG. 2A and FIG. 2B, the signal electrode 8 and the guard electrode 9 are disposed in the through hole 14 that is formed in the side wall of the measuring pipe 5, oil is filled, as the vibration absorbing material 15, into the through hole 14 wherein the signal electrode 8 and the guard electrode 9 are disposed, and the through hole 14 that is filled with this oil is sealed (fluid tight) by a lid 16.

While in the embodiments, described above, the signal electrode 8 and the guard electrode 9 were separate, the signal electrode 8 and the guard electrode 9 may be integrated.

Figure 3A:
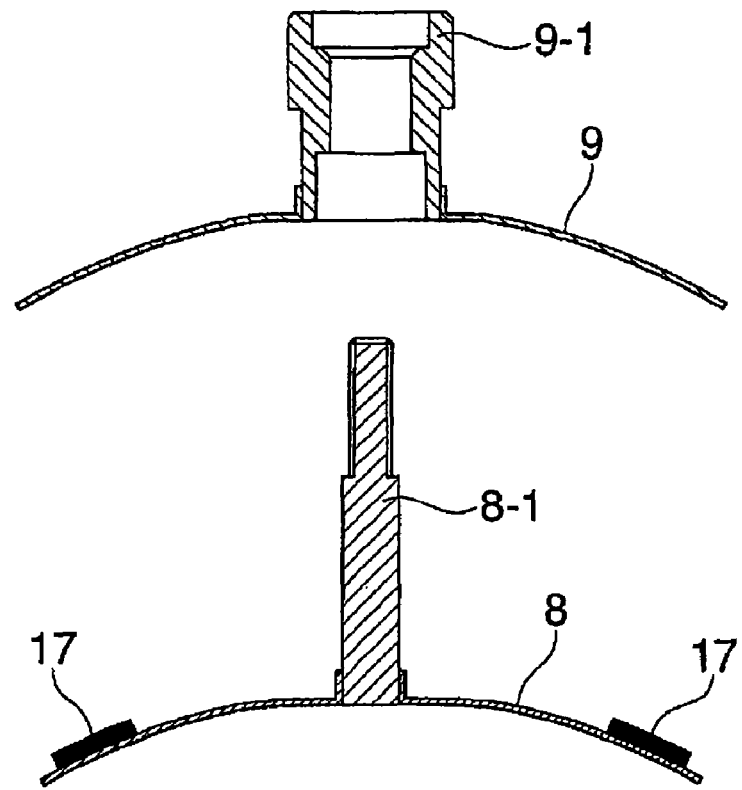
FIGS. 3A-3C FIG. 3A through FIG. 3C are diagrams for explaining the method of assembling the integrated signal electrode and guard electrode with an insulating space, used in a further embodiment of a capacitive electromagnetic flowmeter according to the present invention.
Figure 3B:
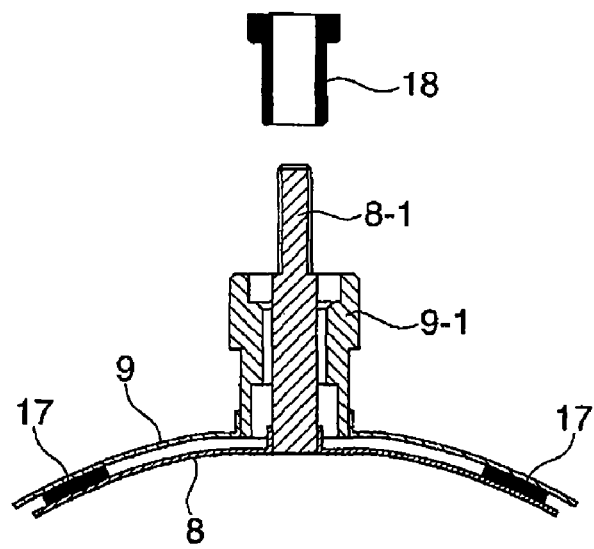
Figure 3C:
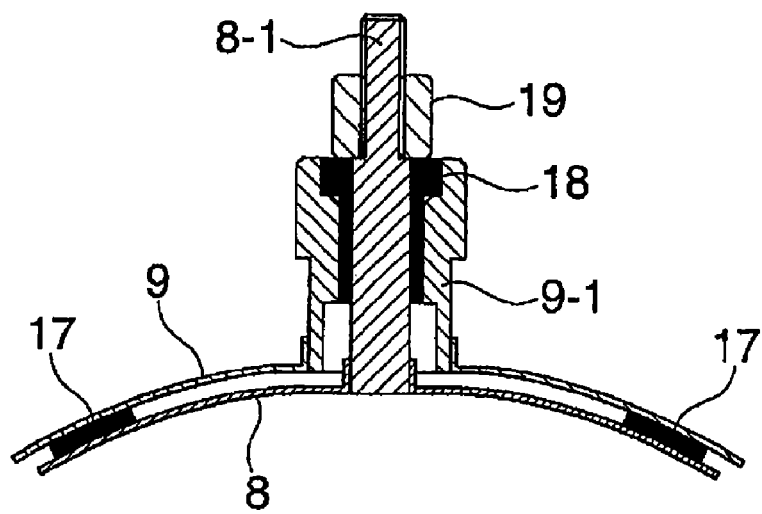

For example, as illustrated in FIG. 3A, a guide portion 9-1 is formed in the center portion of the guard electrode 9, along with a lead pin 8-1 being attached to the center portion of the signal electrode 8. In a state wherein a first insulating spacer 17 is interposed between the signal electrode 8 and the guard electrode 9, the guide portion 9-1 of the guard electrode 9 is fitted onto the lead pin 8-1 of the signal electrode 8, to link the signal electrode 8 and the guard electrode 9, as illustrated in FIG. 3B. Following this, a second insulating spacer 18 is pressed into the gap between the lead pin 8-1 and the guide portion 9-1, after which, as illustrated in FIG. 3C, a nut 19 is tightened onto the tip end of the lead pin 8-1.

Figure 4:
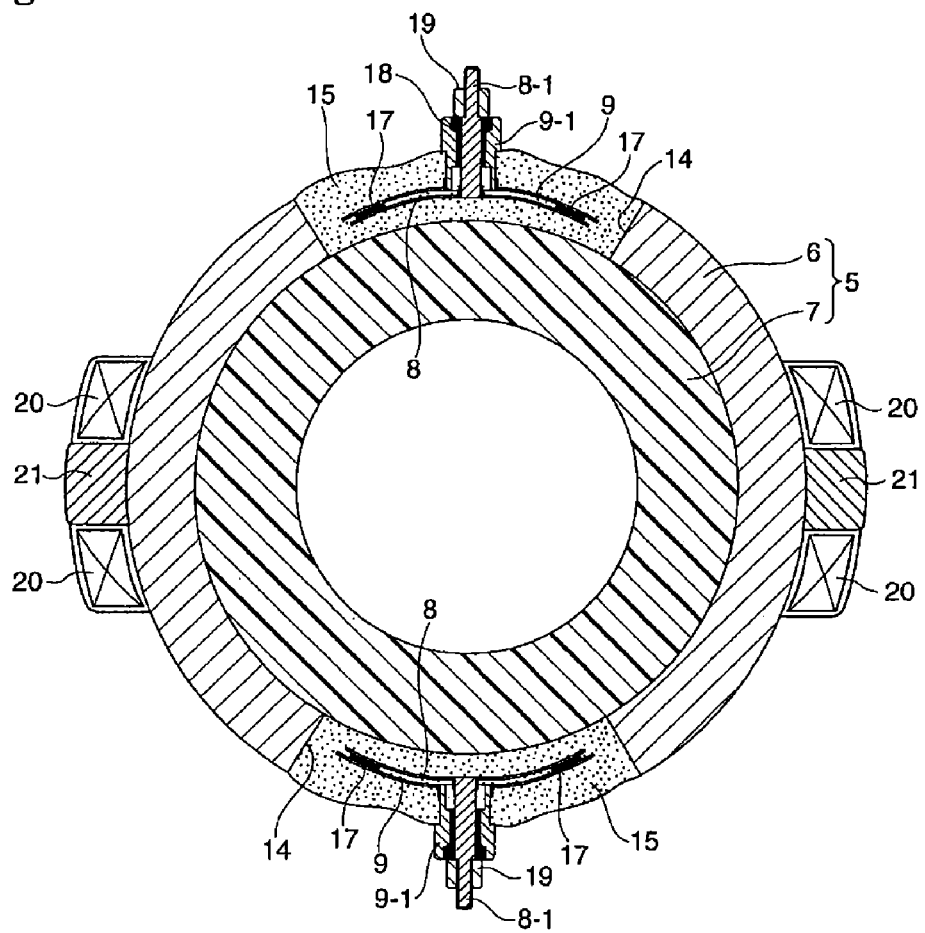
FIG. 4 FIG. 4 is a cross-sectional diagram of a capacitive electromagnetic flowmeter according to an embodiment according to the present invention.

In this way, the integrated insulating spacers 17 and 18 are disposed in the through hole 14 that is formed in the nonmagnetic pipe 6, as illustrated in FIG. 4, and the vibration absorbing material 15 is filled into the through hole 14. In this case, the lead pin 8-1 is exposed to the outside of the insulating vibration absorbing material 15, so the electromotive force that is produced in the fluid that is flowing in the measuring pipe 5 can be extracted from the exposed lead pin 8-1.

Note that, as an effect derived from the invention is the effect of enabling manufacturing, even when the diameter is small, because the signal electrode 8 and the electrode 9 are assembled on the outside of the measuring pipe 5. For example, in the second conventional example illustrated in FIG. 6A and FIG. 6B, the signal electrode 8 and the guard electrode 9 are assembled from the inside, and are formed embedded in the resin lining 7, so if the diameter is small, it is not possible to install the signal electrode 8 and the guard electrode 9 from the inside. In contrast, in the embodiments above, it is still possible to assemble the signal electrode 8 and the guard electrode 9 from the outside of the measuring pipe 5, even if the diameter of the measuring pipe 5 is small. Furthermore, for the vibration absorbing material 15, FTFE resin (a thermal plastic fluorine resin), or the like, which make relatively good contact with stainless steel, may be used.

What is claimed is:

1. A capacitive electromagnetic flowmeter comprising:
   a measuring pipe;
   an insulating resin lining provided on an inner peripheral surface of a magnetic pipe;
   an excitation coil for producing a magnetic field in a direction that is perpendicular to the direction of a fluid that is flowing within the measuring pipe;
   a through hole penetrating a side wall of a nonmagnetic pipe in a direction that is perpendicular to the magnetic field produced by the excitation coil;
   a signal electrode that is coupled by electrostatic capacitance with the fluid that flows within the measuring pipe, disposed with-in the through hole;
   a guard electrode for shielding the signal electrode, disposed within the through hole; and
   an insulating vibration absorbing material, filled into the through hole, so as to cover the entire periphery of the signal electrode and the guard electrode.

2. The capacitive electromagnetic flowmeter as set forth in claim 1, wherein:
   the signal electrode and the guard electrode are integrated with an insulating spacer therebetween.

3. The capacitive electromagnetic flowmeter as set forth in claim 1, wherein:
   the vibration absorbing material is a gelatinous substance.

4. The capacitive electromagnetic flowmeter as set forth in claim 3, wherein:
   the gelatinous substance is a fluid silicon resin with a low cross-linking density.

5. The capacitive electromagnetic flowmeter as set forth in claim 1, wherein:
   the vibration absorbing material is a fluid that is sealed within the through hole.

\* \* \* \* \*